June 24, 1930.  M. J. KAUFMAN  1,765,980
PICTURE FRAME
Filed July 27, 1929
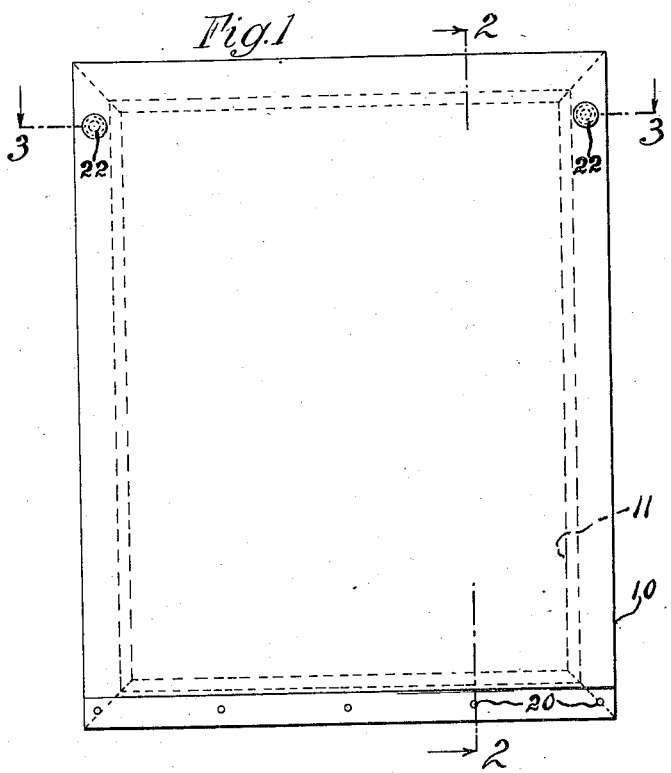
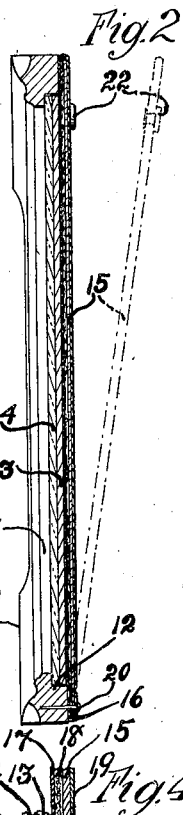
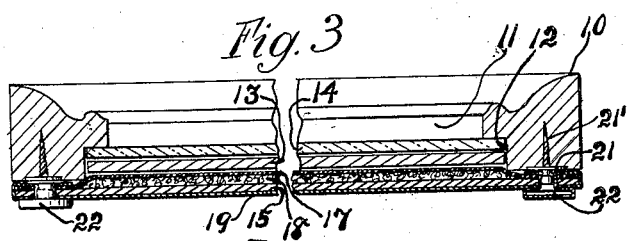
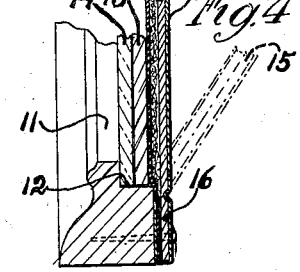
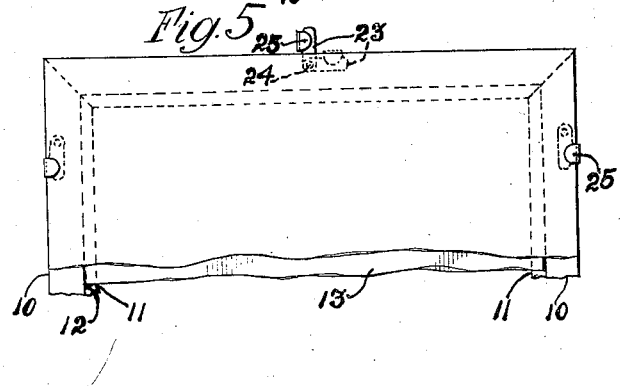
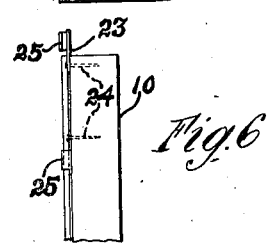
Inventor
Morris J. Kaufman
by J. Daniel Stuwe
Attorney.

Patented June 24, 1930

1,765,980

UNITED STATES PATENT OFFICE

MORRIS J. KAUFMAN, OF CHICAGO, ILLINOIS

PICTURE FRAME

Application filed July 27, 1929. Serial No. 381,549.

This invention relates to picture frames, adapted for framing photographs and other pictures.

The main object of this invention is to provide a picture frame which comprises a readily openable and readily closable back member or panel, so that a photograph or picture can be readily inserted in the frame and can again be readily removed therefrom and a different one inserted whenever desired. Another object is to provide my invention with compressible means located between the back panel and the frame, so as to hold the back panel and the frame dust-proof together, and thereby dispense with the paper ordinarily pasted over the back of the panel and the frame. A further object is to provide my invention with means on the inward side of the back panel which will serve to hold the panel dust-proof on the frame, and will also serve to bear against the picture mounted thereunder and hold it firmly in position.

These and other objects and advantages are attained with my invention, as will become apparent from the following description, taken in connection with the accompanying drawing, in which Fig. 1 is a view of the rear of a picture frame embodying my invention.

Fig. 2 is a longitudinal sectional view thereof, taken on line 2—2 of Fig. 1.

Fig. 3 is an enlarged cross-sectional view, partly broken away, taken on line 3—3 of Fig. 1.

Fig. 4 is a longitudinal sectional detail of the corner of the frame, on a larger scale than Fig. 2.

Fig. 5 is a partial rear view showing a modified form of readily releasable fastening means for the back panel.

Fig. 6 is a partial edge view showing this modified form of fastening means.

In the drawing is illustrated an embodiment of my invention in its preferred form, in conjunction with a picture frame 10 which has an exposure opening 11 therein, and is provided with a rabbeted portion 12 at the rear for receiving a picture 13 and a glass or other transparent member 14 in front of the picture, to view the picture through said opening and said transparent member.

The improved back member or back panel of this invention comprises a main part 15 and a strip 16 at one end of said main part, both being of substantially rigid material. Said part 15 and strip 16 are preferably formed from one piece of chip board, or other suitable material, which is of the same size as the outside of the frame, and is creased about ½ inch from one end to provide this strip 16 so that said part 15 may be swung along said crease, and with respect to said strip.

Flexible material 17, preferably duveteen or similar suitable material, is placed forward or inward of the main part 15 and strip 16; and readily compressible material or yieldable means 18, which preferably consists of cotton wadding or the like, is mounted between said flexible material 17 and the front face of said main part 15, as best indicated in Fig. 4. This yieldable means 18 and the flexible means 17 provide compressible means on the front or inward side of the back member or panel, to furnish a dust-proof closure between said back member and the frame, and also to firmly bear against the back of the picture 13 and function in holding it firmly in position in the frame.

Other flexible material 19 is mounted on the rear or outside of the back member, and it preferably consists of keratol, an imitation leather finished cloth, the same being preferably glued onto the outside of said main part 15 and said strip 16 and the four edges being turned over to the front or inside and glued over the edges of the material 17, as best shown in Figs. 3 and 4.

These flexible materials or covering cloths 17 and 19, at the front and the back of said back member, thus cover the main part 15 and the strip 16 together, and due to the crease between said part and said strip, also to the flexibility of said materials 17 and 19, this main part 15 is enabled to be swung with respect to said strip.

The back member is mounted on the back of the frame by securing strip 16 with its covering material onto the frame, preferably by tacking it onto the rear of an end bar of the frame, as with brads 20. The main part 15 of the back member is thus made swingable on said secured strip, rearwardly from the frame, as indicated in Figs. 2 and 4, to enable convenient inserting and withdrawing and exchanging of the picture whenever desired.

Means is provided for holding the back member closed and to enable and facilitate convenient and quick opening thereof. This means comprises readily openable fastening elements or securing means, and in the form shown in Figs. 1 to 4 this securing means comprises snap fasteners which include studs 21 having nail or screw ends 21′ driven into the frame, also socket members or buttons 22 which are mounted in the back member, for receiving said studs, as best shown in Fig. 3, thus providing for firm and dust-proof closing of the back member, and for ready opening thereof and access to the picture.

In Figs. 5 and 6 the fastening elements are shown in a different form, being in the shape of latch members 23, each being pivotally secured to the frame by means of a pivot pin 24, and having a hook portion 25 for engaging the edge of the back member to hold the latter in closed position, as shown in the drawing.

What I claim as my invention and desire to secure by Letters Patent is:

1. A frame for mounting a picture therein, and a back member for retaining said picture in the frame, said back member including means of rigid material having imitation leather outward thereof and having fabric material inward thereof and wadding between said rigid material and said fabric material, thereby providing a dust-proof connection between said back member and frame, also providing means for engaging and retaining the picture firmly in position.

2. A picture frame rabbeted at the rear for mounting a picture therein, a substantially rigid back member mounted on the rear of said frame and having first wadding and then fabric material on its inward side to provide a dust-proof closure between said member and the frame and for engaging and retaining the picture firmly in position, and means including a socket on said back member and a stud on said frame to mount said back member on said frame to provide for convenient opening and closing of said member and removal of said picture.

3. A picture frame rabbeted at the rear for mounting a picture therein; a back member mounted on the rear of said frame and including a main part and a strip at one end thereof, also flexible material covering said part and strip and holding them swingably together; means for securing said strip to the frame, to enable swinging of the main part with respect to the frame; socket means on said main part, and studs secured in said frame, to enable convenient opening and closing of said main part and inserting and removal of a picture; and wadding mounted between the front of said main part and its front covering material, to provide a dust-proof connection between said back member and frame, also providing means for engaging and retaining the picture firmly in position.

In testimony whereof I have signed my name to this specification.

MORRIS J. KAUFMAN.